(No Model.)
W. BLAKESLEE.
MILK PAIL.
No. 438,264.  Patented Oct. 14, 1890.
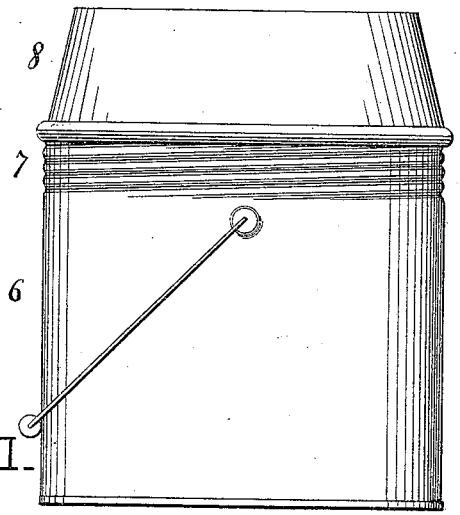
Fig I.
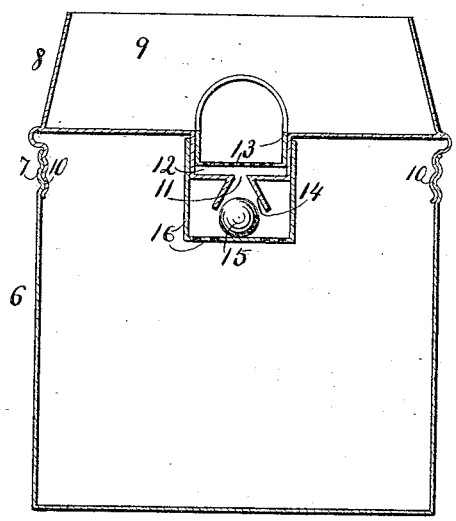
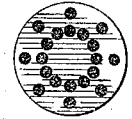
Witnesses,
S. E. E. Stevens.
P. E. Stevens.
Inventor.
Wilmot Blakeslee.
W. X. Stevens. Atty.

UNITED STATES PATENT OFFICE.

WILMOT BLAKESLEE, OF LEXINGTON, NEBRASKA.

MILK-PAIL.

SPECIFICATION forming part of Letters Patent No. 438,264, dated October 14, 1890.

Application filed April 12, 1890. Serial No. 347,722. (No model.)

*To all whom it may concern:*

Be it known that I, WILMOT BLAKESLEE, a citizen of the United States, residing at Lexington, in the county of Dawson and State of Nebraska, have invented certain new and useful Improvements in Milk-Pails, of which the following is a description.

This invention relates to milk-pails; and its object is to adapt pails or buckets to strain the milk before it enters the body of the pail, whether the milk be poured in quantity into the pail or be milked therein directly from the cow, to prevent the milk from being slopped out by rough handling or from running out in any serious amount should the pail be tipped over.

To this end my invention consists in the construction and combination of parts forming a milk-pail, hereinafter described and claimed, reference being had to the accompanying drawings, in which—

Figure 1 is a side view of my milk-pail complete. Fig. 2 is a central vertical section of the same. Fig. 3 is a top view of the strainer, and Fig. 4 is an under side view of the valve-cap.

6 represents the body of the pail, which may be of any usual form provided with a screw-thread 7 around the top.

8 represents the cover, whose upper portion is in the form of an open disk 9, and whose lower portion is provided with a screw-thread 10, adapted to engage the thread 7 and to hold the cover so closely upon the body as to prevent leakage at the joint, even if the bucket were tipped over, and yet permitting the cover to be readily removed for any purpose. At the center of the cover is an inlet 11, through which milk may enter the pail while the cover is on. The inlet is surrounded by a sink-hole 12, into which a small strainer 13 is removably fitted, and it has a mouth 14 flaring downward to form a valve-seat for the ball-valve 15.

16 is an inverted cap fitted closely and yet removably around the under side of the metal forming the sink-hole 12 to hold the valve loosely in the valve-seat, this cap being perforated to permit milk to flow freely through it.

Milk either drawn fresh from the cow or poured from some other vessel may first be received into the open dish-cover 9, whence it runs through the strainer 13, by the valve 15, and through the cap 16 into the body of the pail. The milk will be prevented from slopping out of the pail by the cap and valve located across the flaring mouth 14, and if the pail is tipped over, the valve 15 falls into its seat 14 and closes the mouth, thus preventing any material loss of milk before the pail may be righted.

Such pails or buckets may be made of any suitable material.

Having thus fully described my invention, what I believe to be new, and desire to secure by Letters Patent, is the following:

The combination of a milk-pail body having a screw-thread around its top, a cover having a screw-threaded flange extending downward to engage the aforesaid screw-thread, and a rim extending upward and forming a dish above the pail-body, the cover having also a sink-hole in its bottom, provided with a downward-flaring mouth, a strainer removably fitted to the said sink-hole, and a perforated cap fitted around the downward projection of the latter, and a ball held loosely in the said flaring mouth by the said cap to act as a valve, substantially as described.

WILMOT BLAKESLEE.

Witnesses:
GEO. F. CAIN,
GEO. W. MILLER.